H. B. OSGOOD.
Balance Scales.
No. 21,145.
Patented Aug. 10, 1858.
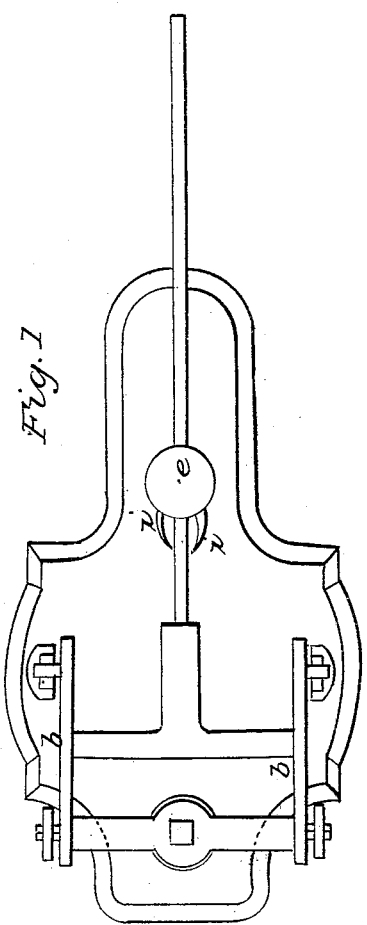
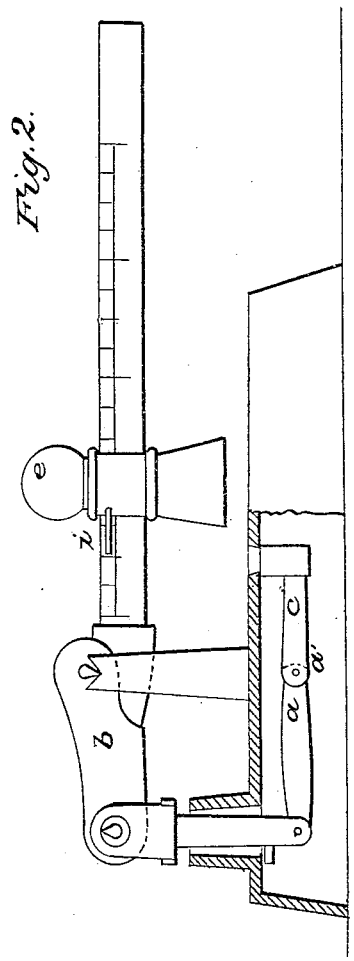

UNITED STATES PATENT OFFICE.

H. B. OSGOOD, OF MERIDEN, CONNECTICUT.

COUNTER-SCALE.

Specification of Letters Patent No. 21,145, dated August 10, 1858.

*To all whom it may concern:*

Be it known that I, HORATIO B. OSGOOD, of Meriden, county of New Haven, and State of Connecticut, have invented certain new and useful Improvement in Counter-Scales; and I do hereby declare that the following is a full, clear, and exact description of the same, reference being made to the annexed drawing, making a part of this specification, in which—

Figure I is a top or plan view. Fig. II is a side view or elevation, partly in section.

Similar letters indicate similar parts throughout.

My invention consists in an improved method of bringing the pea to a standard weight for reading from a double scale i. e. a scale marked on each side of the beam.

In adjusting the pea in the old way to standard weight, it must be bored and filled in, until it will stand exactly at the scale mark, and the adjustment so made limits the beam to the use of a scale mark upon one side only, for two scales could scarcely be made to coincide accurately by the stamping process, which is that generally employed. By my improvement the pea is readily made to weigh according to the standard without requiring any alteration of it after being cast and finished, and it is also capable of being used with scales on each side of the beam.

The pea is shown at (*e*) and is placed on the beam, the latter passing through a slot. On each side of this slot is a malleable pin (*i*). The points of these pins are brought by bending the wire of which they are composed so that each shall stand near to the scale. The pea is now made to weight correctly, by shortening the end of the pin until its end points directly upon the proper scale mark, the pea itself standing a little way from it. The other pin is then made to conform to the scale on the opposite side of the beam, and thus a correct weight will be given from both sides, and hence either side may be used, as most convenient.

I claim—

The method of bringing the pea to standard weight and to enable it to indicate weight from scales on opposite sides of the beam, consisting of the adjusting pins in combination with the pea, as described, substantially in the manner set forth.

H. B. OSGOOD.

Witnesses:
J. H. MAYNARD,
THOMAS DUCEY.